(12) United States Patent
Hemmi et al.

(10) Patent No.: US 7,027,549 B2
(45) Date of Patent: Apr. 11, 2006

(54) NUCLEAR POWER PLANT SYSTEM AND METHOD OF OPERATING THE SAME

(75) Inventors: Yukio Hemmi, Yokohama (JP); Shuji Seki, Yokohama (JP); Yutaka Uruma, Kawasaki (JP); Minoru Kobayashi, Matsudo (JP); Fumihiko Ishibashi, Yokohama (JP); Ichiro Inami, Tokyo-to (JP); Takao Baba, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/821,732

(22) Filed: Mar. 30, 2001

(65) Prior Publication Data

US 2002/0057755 A1     May 16, 2002

(30) Foreign Application Priority Data

Mar. 31, 2000 (JP) .............................. 2000-099423
Mar. 30, 2001 (JP) .............................. 2001-098275

(51) Int. Cl.
    *G21C 19/42*     (2006.01)

(52) U.S. Cl. .................... 376/313; 376/305; 376/315; 376/371

(58) Field of Classification Search ................ 376/305, 376/306, 310, 313, 371, 315
See application file for complete search history.

(56) References Cited

U.S. PATENT DOCUMENTS

| | | | | |
|---|---|---|---|---|
| 5,028,384 A | * | 7/1991 | Skarpelos et al. | .......... 376/306 |
| 5,268,947 A | * | 12/1993 | Bastide et al. | .............. 376/422 |
| 5,287,392 A | * | 2/1994 | Cowan II et al. | ........... 376/301 |
| 5,465,278 A | * | 11/1995 | Cowan, II et al. | .......... 376/245 |
| 6,217,999 B1 | * | 4/2001 | Zhang et al. | ............. 428/312.6 |
| 6,228,502 B1 | | 5/2001 | Saitoh et al. | ............... 428/472 |

FOREIGN PATENT DOCUMENTS

| | | | | |
|---|---|---|---|---|
| JP | 8-313664 | | 11/1996 | ................. 376/306 |
| JP | 11-285635 | * | 10/1999 | |
| WO | 96/29375 | * | 9/1996 | |

OTHER PUBLICATIONS

Tryk, D. A., et al., "Recent topics in photoelectrochemistry: achievements and future prospects", Electrochimica Acta, vol. 45, pp. 2363-2376 (2000).

Qing-ji Liu et al; Study on super-hydrophillcity property of TIO2 thin films; *Dept. of Material Science and Engineering*; Yunnan University Kunming; Peoples Republic of China; 1pg; 8(3) 238-242: (2002).

* cited by examiner

*Primary Examiner*—Jack Keith
*Assistant Examiner*—Daniel Lawson Greene, Jr.
(74) *Attorney, Agent, or Firm*—Foley & Lardner LLP

(57) ABSTRACT

Migration of radioactive materials from a pressure vessel to a steam system in a nuclear power plant is suppressed by using a dryer (3) provided with corrugated plates (22) having surfaces coated with an inorganic ion-exchange material stable under a condition in which high-temperature water exist, such as $TiO_2$.

7 Claims, 5 Drawing Sheets

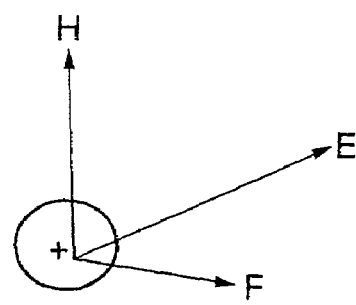
FIG. 3
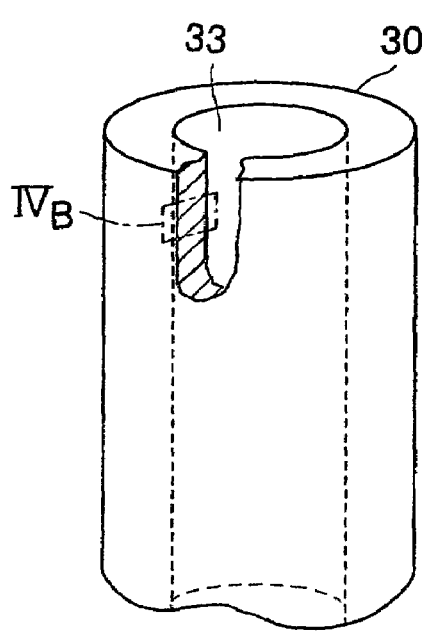
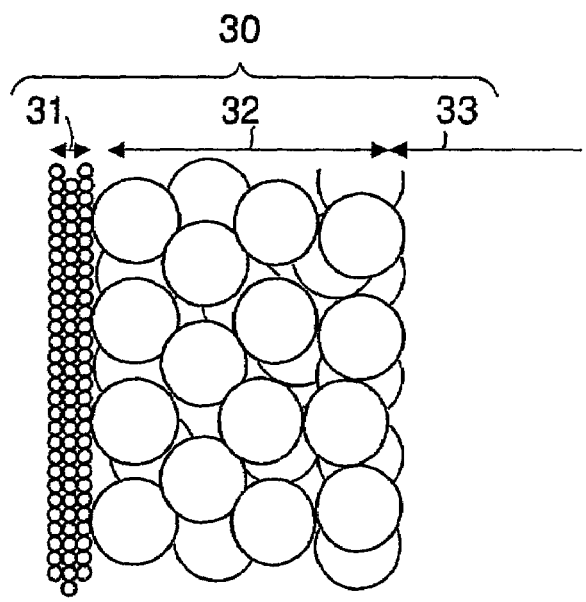
FIG. 4A    FIG. 4B

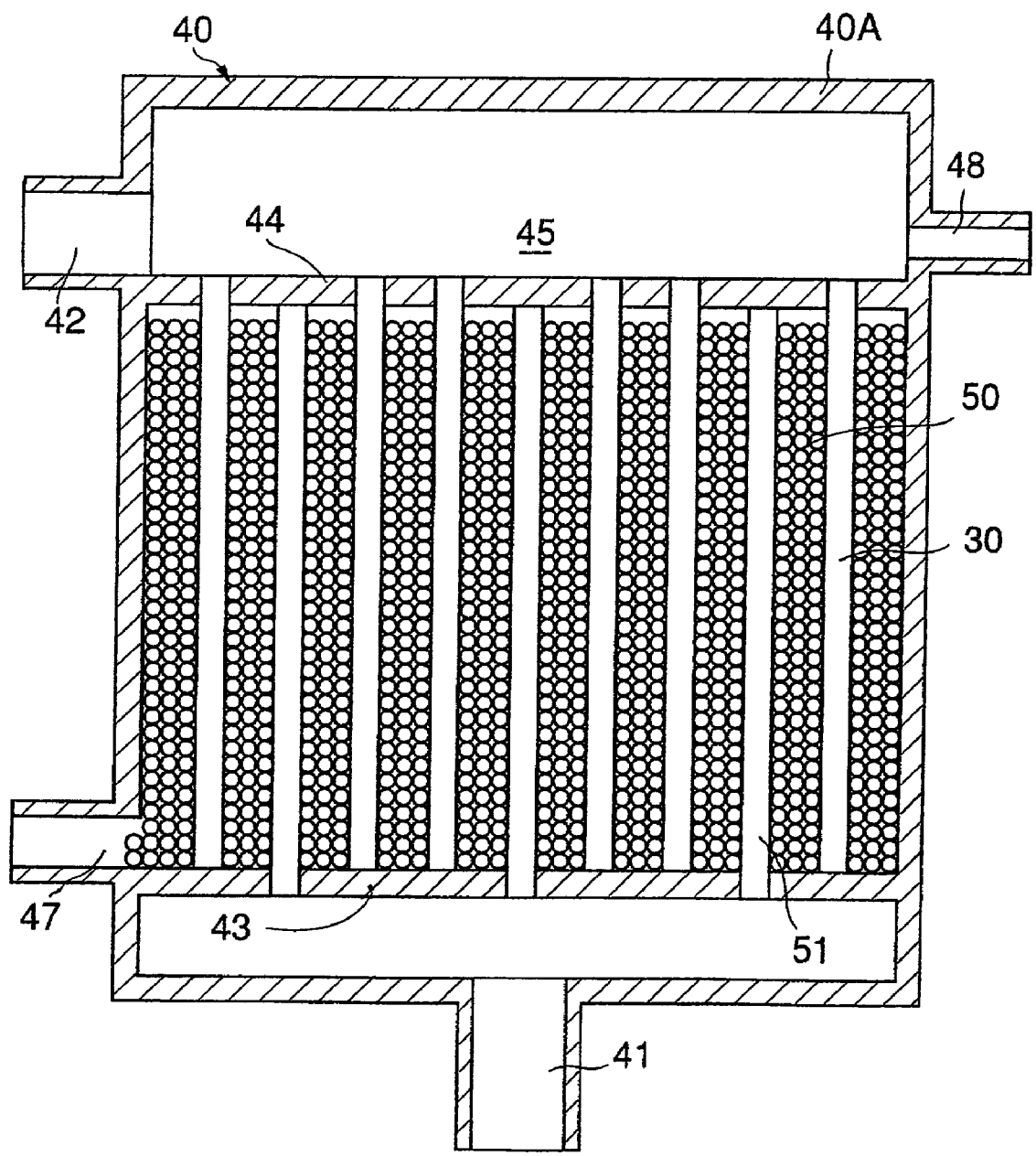
F I G. 7

NUCLEAR POWER PLANT SYSTEM AND METHOD OF OPERATING THE SAME

BACKGROUND OF THE INVENTION

1. Field of the Invention

The present invention relates to techniques for reducing the migration of radioactive materials from a nuclear reactor to a steam and turbine system.

2. Description of the Related Art

In a nuclear power plant, the reduction of exposure during operation and regular inspection is important. Various materials have been proposed, water quality control measures have been taken and the improvement of purifying facilities have been made principally for the reduction of the cobalt-60 concentration of reactor water and the migration of radioactive materials to the water systems of nuclear reactors. However, any measures to reduce the migration of radioactive materials to the main steam line and turbine system have not been taken.

Modes of making radioactive materials migrate to a steam system of a present nuclear power plant system and the ratio between the radioactive material carrying effects of the modes will be explained with reference to FIGS. 1 and 2 and problems to be solved will be explained.

Referring to FIG. 1, part of radioactive materials produced by a reactor core 10 contained in a reactor pressure vessel (hereinafter referred to simply as "pressure vessel") 9 is removed by a reactor water purifying system 5. Most part of the radioactive materials adheres to devices placed in the pressure vessel 9 through which saturated water is circulated, the inner surface of the pressure vessel 9 and pipes extending on the upper side of the reactor water purifying system 5. Very small part of the radioactive materials dissolved in the reactor water in ions or molecules has a partial vapor pressure and volatilizes together with steam.

On the other hand, a steam separator 4 and a dryer 3 remove most part of liquid drops. Very small part, i.e., 0.1% or below, of liquid drops migrates in small particles through a valve 1 placed at the inlet of the turbine system into a steam turbine and contaminates the steam turbine system and the associated parts. Recently, the temperature of the nuclear reactor is lowered rapidly when the nuclear reactor is shut down. When thus shutting down the nuclear reactor, water having a high radioactive concentration and discharged from the reactor water purifying system 5 is sprayed by a head spray nozzle 6 and, consequently, radioactive materials contained in the sprayed liquid drops migrate to the steam system.

The behavior of liquid drops in a dryer (steam dryer) 3 closely related to the migration of liquid drops to the steam system will be described with reference to FIG. 2. Steam containing liquid drops in a wetness of 10% or below and passed through the steam separator 4 shown in FIG. 1 is dispersed by steam dispersing openings 20, flows through spaces between corrugated plates 22 and an upper part of the pressure vessel 9 into a line 11. Whereas the steam flows along the surfaces of the corrugated plates 22, liquid drops having large mass collide against the surfaces of the corrugated plates 22 and are caught by the corrugated plates 22. The liquid drops thus caught by the corrugated plates 22 flows down along the corrugated plates 22 into a drain pan 24, and returned into the reactor water system through a drain pipe 25.

If the steam containing liquid drops flows at a high velocity through the spaces between the corrugated plates 22; that is, if time for which the steam stays in the spaces between the corrugated plates 22 is short, minute liquid drops flow through the spaces between the corrugated plates 22 without colliding against the corrugated plates 22. Furthermore, the steam flowing at a high velocity through the spaces between the corrugated plates 22 separates the liquid drops and radioactive materials, which have been collided against and adhering to the corrugated plates 22, off the corrugated plates 22 and carries the same away to the steam system.

Thus, the ratio of migration of radioactive materials to the steam system in an actual nuclear power plant is greater than that calculated on the basis of the gas-liquid distribution ratio of the radioactive materials dissolved in water. Radioactive materials migrate to the steam system in the following three modes; (i) a first migration mode in which radioactive materials dissolved in the reactor water evaporate and migrate into the steam system, (ii) a second migration mode in which liquid drops collided against the components of a device, such as a dryer, and caught by the components of the device are separated from the components of the device in liquid drops or radioactive materials dried and adhering to the components of the device are separated from the components of the device, and the separated liquid drops or the separated radioactive materials are carried into the steam system and (iii) a third migration mode in which liquid drops sprayed by a head spray migrate to the steam system. The ratio between the respective radioactive material carrying effects of those modes is 1:3:1.

Recently, the enhancement of power, temperature capacity and pressure capacity without changing the sizes of devices has been desired from the economical point of view. However, in view of the forgoing problems, it can be readily conjectured that the ability to separate liquid drops from steam of the steam separator and the dryer will become insufficient and the migration of radioactive materials to the steam system will increase when the power capacity of the nuclear reactor is increased. If the temperature capacity and pressure capacity are further enhanced, a supercritical state will result. In the supercritical state, all the particles of radioactive materials contained in supercritical water or all the radioactive materials dissolved in supercritical water migrate to the steam system unless a radioactive material separating and removing apparatus is used. Therefore a high-temperature water purifying apparatus is one of the most important apparatuses of the supercritical reactor. In this specification, the term "high-temperature water purifying apparatus" is used to denote an apparatus capable of being used under a high-temperature condition for separating and removing radioactive materials from water or steam.

Various high-temperature water purifying apparatuses that do not entail heat loss have been proposed. However, none of the previously proposed high-temperature water purifying apparatuses is able to avoid performance degradation due to rise in differential pressure caused by contamination by collected corrosion products and organic substances used by the turbine system, and changes in the shape of small holes caused by the volume expansion due to the dissolution, corrosion or oxidation of a filter aid by the chemical instability of high-temperature water and those high-temperature water purifying apparatuses have a short life. Furthermore, those high-temperature water purifying apparatuses have a low trapping capacity and their purifying ability deteriorates in a short time. Consequently, those high-temperature water purifying apparatuses have not been applied to practical uses yet. (Refer to "Filter Guidebook for Pall-Generator", Nihon Pall Ltd., P.8.)

SUMMARY OF THE INVENTION

The present invention has been made in view of the foregoing circumstances and it is therefore an object of the present invention to provide a means for reducing the migration of radioactive materials from a nuclear reactor to a steam turbine system.

To achieve the objective, the present invention provides a nuclear power plant system including: a nuclear reactor; a steam turbine that uses steam generated in a pressure vessel included in the nuclear reactor; and a radioactive material separating and removing apparatus placed in the pressure vessel or in a steam passage extended between the pressure vessel and an inlet of the steam turbine to separate and remove radioactive materials from steam. Preferably, the radioactive material separating and removing apparatus has a high-temperature water purifying apparatus employing a metal or a metal oxide as an ion-exchange material that exchanges ions for radioactive ions, which is stable in an environment where high-temperature water or steam exists.

The present invention also provides a nuclear power plant system including: a nuclear reactor; a steam turbine that uses steam generated in a pressure vessel included in the nuclear reactor; and a radioactive material separating and removing apparatus placed in a reactor water system attached to the nuclear reactor, the pressure vessel or a steam passage extended between the pressure vessel and an inlet of the steam turbine to separate and remove radioactive materials from steam, wherein the separating and removing apparatus employs a metal or a metal oxide as an ion-exchange material that exchanges ions for radioactive ions, which is stable in an environment where high-temperature water or steam exists.

The present invention further provides a method of operating a nuclear power plant system having a nuclear reactor including a pressure vessel provided with a head spray, in order to lower temperature of the pressure vessel. The method including the steps of: limiting range of scattering of water sprayed by the head spray; decreasing size of water drops of the water sprayed by the head spray; and controlling an amount of the water to be sprayed according to the amount of steam generated by heat generated after shutdown of the nuclear reactor.

The present invention further provides a method of operating a nuclear power plant system having a nuclear reactor including a pressure vessel provided with a head spray. The method including the steps of: supplying water not containing any radioactive materials or water having a small radioactive material concentration and supplied from a condensate purifying apparatus or a condensate storage tank.

BRIEF DESCRIPTION OF THE DRAWINGS

FIG. 3 is a diagrammatic view of assistance in explaining directions of motions of charged particles in a magnetic field;

FIG. 4A is a schematic perspective view of a hollow membrane pipe employed in a high-temperature water purifying apparatus;

FIG. 4B is an enlarged view of a part $IV_B$ of the hollow membrane pipe shown in FIG. 4A;

FIG. 7 is a schematic longitudinal sectional view of a third embodiment of high-temperature water purifying apparatus.

DESCRIPTION OF THE PREFERRED EMBODIMENTS

Preferred embodiments of the present invention will be described hereinafter with reference to the accompanying drawings.

First Embodiment

There are spatial and economical difficulties in additionally installing a new radioactive material separating and removing apparatus in an existing nuclear power plant. The reduction of the amount of radioactive materials that migrate to a steam system can be achieved through the enhancement of the abilities of a steam separator 4 and a dryer 3 contained in a pressure vessel 9 by incorporating improvements therein or by replacing the steam separator 4 and the dryer 3 with those having improved abilities. Description will be given on measures to prevent the migration of liquid drops having a high radioactive material carrying effect once collided against the component members of an apparatus, such as the dryer 3, and separated from those component members to the steam system or the migration of dry radioactive materials deposited on the component members of the dryer 3 and separated from the same to the steam system.

Figure 2:
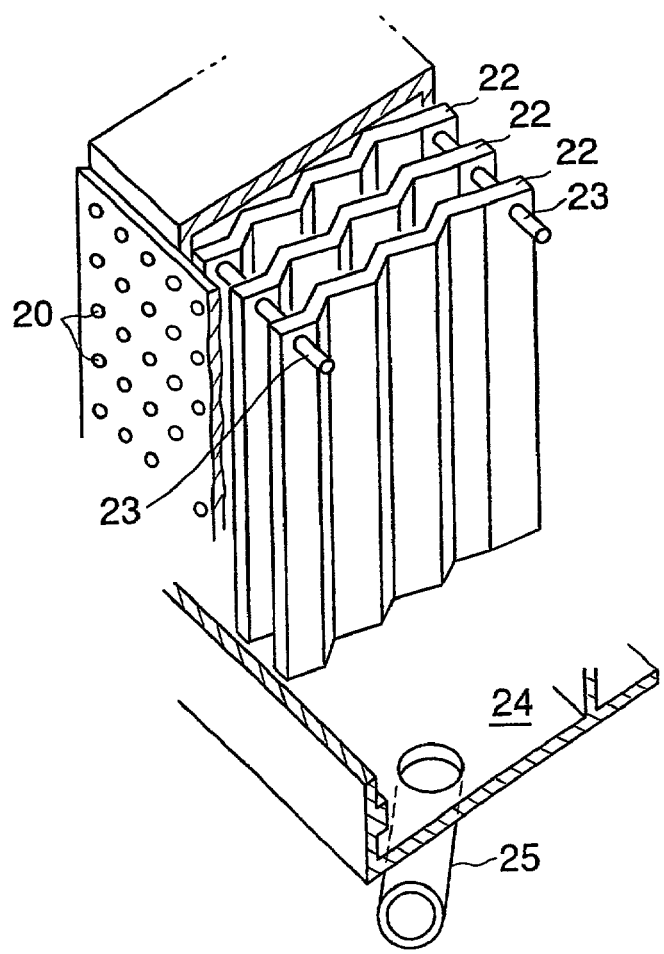
FIG. 2 is a schematic perspective view of a dryer in a first embodiment of the present invention.

FIG. 2 shows a dryer 3 provided with improved corrugated plates 22 having surfaces coated with a coating material, such as $TiO_2$, $ZrO_2$ or ferrite. The surfaces of other component members other than the corrugated plates 22 of the dryer 3 also may be coated with such a coating material.

Ferrite, $TiO_2$ and $ZrO_2$ are chemically stable in high-temperature water or steam and capable of maintaining the following functions for a long period of time.

$TiO_2$ has an ion exchanging ability and/or a superhigh hydrophilic property. $TiO_2$ is used as an ion-exchange material at high temperatures. It is generally known that $TiO_2$ shows a superhigh hydrophilic property when it is used in combination with an $SiO_2$ binder. When the surfaces of the corrugated plates 22 are coated with a substance having a superhigh hydrophilic property, liquid drops fallen on the corrugated plates 22 spread over the surfaces of the corrugated plates 22 in thin liquid films. Such thin liquid films are difficult to separate from the surfaces of the corrugated plates 22 by shearing force exerted thereon by steam stream. Corrosion products contained in the liquid drops adhere firmly in flat films to the surfaces of the corrugated plates 22 after the liquid drops fallen on the surfaces of the corrugated plates 22 have dried up.

Since $TiO_2$ has an ion exchanging ability, the surfaces coated with $TiO_2$ of the corrugated plates 22 are able to catch particles of radioactive materials. Thus, radioactive materials deposit on the corrugated plates 22 in ionized corrosion products and adhere firmly to the surfaces of the corrugated plates 22. Radioactive materials thus deposited on the corrugated plates 22 are difficult to separate from the corrugated plates 22. Principal radioactive materials, such as $^{60}Co$, $^{58}Co$ and $^{54}$Mn that migrate to the steam system exist in ions in the reactor water. Therefore coating the surfaces of the corrugated plates 22 with $TiO_2$ is effective. Ferrite and $ZrO_2$ have an ion exchanging ability as well as $TiO_2$.

$TiO_2$ and $ZrO_2$ exercise a photocatalytic function to decompose organic substances when exposed to radioactive rays, such as intense gamma rays emitted by $^{16}$N, and Cerenkov radiation produced by radioactive rays. Since the turbine system uses organic materials, such as oils, the hydrophilic property and the ion exchanging property of the corrugated plates 22 can be maintained without requiring cleaning work when the surfaces of the corrugated plates 22 are coated with such a material having an ability to decompose organic substances, so that necessary maintenance work can be greatly reduced.

$TiO_2$ is an additive added to steels and is an oxide that can be easily produced on the surface of a material by a corrosive reaction. $TiO_2$ can be produced on the surface of a material by high-temperature oxidation in an atmosphere of reduced pressure on the order of $10^{-4}$ MPa where the concentration of the air is very small. Therefore, the corrugated plates 22 having surfaces coated with a $TiO_2$ coating can be formed by forming the corrugated plates 22 from a plate having a properly adjusted chemical composition, such as a plate of a steel containing Ti, and subjecting the corrugated plates 22 to high-temperature oxidation. When it is desired to form a $TiO_2$ coating containing $SiO_2$ as a binder, the corrugated plates 22 are formed, for example, from a steel plate of a steel containing Ti and Si, and the corrugated plates 22 are subjected to a high-temperature oxidation process. The surfaces of the corrugated plates 22 may be coated with very fine $TiO_2$ and $SiO_2$ fibers. When the surfaces of the corrugated plates 22 are coated with such very fine fibers, water is made to soak the very fine fibers by capillarity. Consequently, the water fallen on the corrugated plates 22 undergoes scarcely the shearing force of steam and is difficult to separate from the corrugated plates 22. After the water fall on the corrugated plates 22 has been dried, corrosion products contained in the water are held between the fine fibers.

A $TiO_2$ coating can be formed on the surfaces of the corrugated plates 22 by forming a layer of a material from which $TiO_2$ can be easily produced, such as Ti or a Ti alloy, and subjecting the layer to high-temperature oxidation. The Ti or Ti alloy layer can be formed by a known physical method, such as thermal spraying, or a chemical method. When it is desired to coat the surfaces of the corrugated plates 22 with a coating of $TiO_2$ and an $SiO_2$ binder, the surfaces of the corrugated plates 22 are coated with, for example, a metal from which $TiO_2$ and $SiO_2$ can be easily produced by a physical or chemical method and the corrugated plates 22 are subjected to high-temperature oxidation.

A $ZrO_2$ coating can be formed by the same method. A $ZrO_2$ coating can be formed by forming a layer of a material from which $ZrO_2$ can be easily produced, such as Zr or a Zr alloy, by a physical or chemical method and subjecting the layer to high-temperature oxidation.

Ferrite can be produced by subjecting a Fe-base alloy, such as a stainless steel, or a nickel-base alloy, such as Inconel, to high-temperature oxidation.

Coatings of $TiO_2$, $ZrO_2$ and ferrite can be formed on the surfaces of corrugated plates of a dryer, which has been used in an existing nuclear power plant for the aforesaid effects. When forming such a coating on the corrugated plates of a used dryer, the surfaces of the corrugated plates are cleaned by a jet cleaning method or the like to remove n-type semiconductor oxides deposited on and comparatively loosely adhering to the surfaces of the corrugated plates and to expose a p-type oxide film firmly adhering to the surfaces of the corrugated plates. Then a $TiO_2$ $ZrO_2$ or ferrite coating is formed on the surfaces of the corrugated plates by a spraying method using a remotely controllable spray nozzle or a thermal spraying method.

The improvement of the trapping capacity according to the above is achieved by preventing the separation of the trapped liquid drops or radioactive materials. Next, a method that improves the trapping efficiency by positively catching liquid drops or radioactive materials will be described hereinafter.

Very fine water drops and charged particles, such as ions and molecules, can be easily charged because they are minute and radioactive. When a charged particle is in an Electric field E or a magnetic field H as shown in FIG. 3, a force F acts on the charged particle in a direction perpendicular to both the electric field E and the magnetic field H. Charged particles can be moved toward the corrugated plates 22 by using such effect of an electric field or a magnetic field.

Trapping of radioactive materials using an electric field is applied to a radioactive ray monitor. A trapping technique using an electric field for trapping minute particles is used prevalently in the chemical engineering field. A particle moving technique using a magnetic field for moving particles is applied to charged particle accelerators.

Charged particles can be trapped by the dryer 3 shown in FIG. 2 by forming fixed bars 23 holding the corrugated plates 22 of an insulating material, electrically isolating the corrugated plates 22 from the casing of the dryer, and applying a voltage across the adjacent corrugated plates 22.

A power source is necessary to realize such a function. Although power may be supplied by an external power source, power is available by the following method without using any external power source. The surfaces of the corrugated plates of a used dryer are cleaned by a jet cleaning method or the like to remove n-type semiconductor oxides deposited on and comparatively loosely adhering to the surfaces of the corrugated plates and to expose a p-type oxide film firmly adhering to the surfaces of the corrugated plates. Then a $TiO_2$ or $ZrO_2$ coating is formed on the surfaces of the corrugated plates. Since $TiO_2$ and $ZrO_2$ are n-type semiconductors, the $TiO_2$ or $ZrO_2$ coating is excited by radioactive rays or Cerenkov radiation generated by radioactive rays. Consequently, electrons break their bonds and create holes, so that electricity is generated. The corrugated plates are able to use this electricity for scavenging charged particles; that is, power generated by photocells formed of the superposed layers of the p-type oxide film and the n-type semiconductor oxide film can be used as power sources.

In the foregoing description, the p-type oxide film is supposed to be formed by high-temperature oxidation during the operation of the dryer. A p-type oxide film may be artificially formed when fabricating a new dryer.

The trapping efficiency of the dryer can be improved by changing the geometrical shape of the corrugated plates 22 instead of using the physical or chemical method.

When the dryer 3 is designed by the present design rule, the probability of collision of a single water molecule against the corrugated plates 22 of the dryer 3 is as small as about 5%. Therefore it is theoretically possible to make substantially 100% of water drops collide against the corrugated plates 22 if the contact area of the corrugated plates 22 are increased by twenty, provided that the condition of flows in the dryer 3 is not changed. The contact surface area of the corrugated plates 22 can be increased, when the thickness of each corrugated plate 22 is appropriately decreased on condition that the necessary mechanical strength of the corrugated plat 22 is maintained.

The above method of increasing the probability of collision is effective in improving an ability of separating and removing minute water drops, ions and molecules contained in a multiphase flow and moving at a low migration speed toward the surfaces of the corrugated plates 22. Although differential pressure rises unavoidably when the contact surface area of the corrugated plates 22 is increased, increase in the contact surface area increases the probability of collision of the radioactive materials contained in water or steam against the corrugated plates 22 and the trapping efficiency of the corrugated plates 22.

The above embodiment has been described in connection with the improvement of the corrugated plates 22 of the dryer 3. However, the techniques relating to the above embodiment are applicable to the walls themselves of the pressure vessel of the nuclear reactor, and are also applicable to other apparatuses arranged inside and outside the pressure vessel through which water, steam or a multiphase fluid containing water and steam flows. The surfaces exposed to water or steam of the component members of those apparatuses are coated with $TiO_2$, $ZrO_2$ or ferrite for the substantially the same effects as the aforesaid ones.

Second Embodiment

A second embodiment of the present invention will be described. The second embodiment relates to the improvement of a high-temperature water purifying apparatus provided with a filter that can be used at a high temperature, i.e., a high-temperature filter.

Figure 5A:
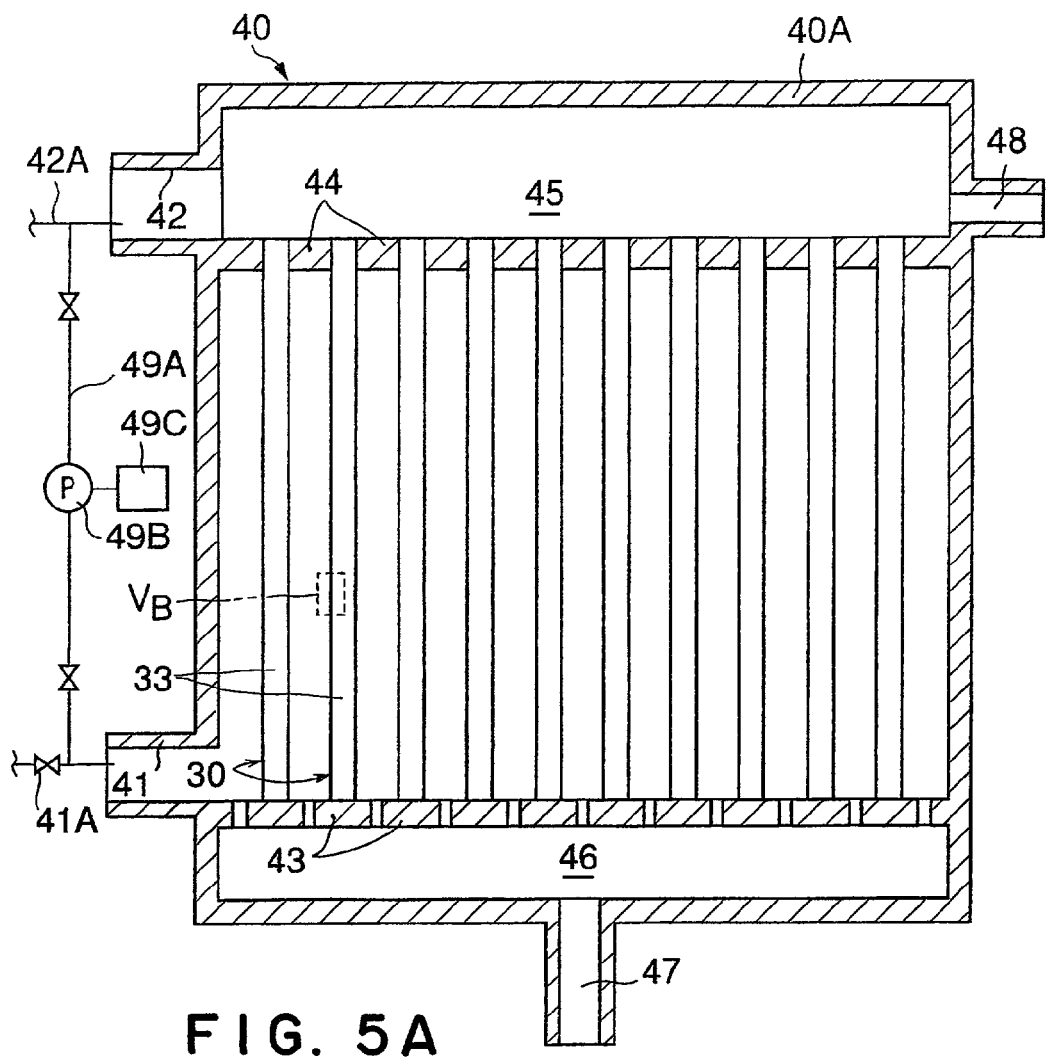
FIG. 5A is a schematic longitudinal sectional view of a second embodiment of a high-temperature water purifying apparatus.

FIG. 5A shows a high-temperature water purifying apparatus 40 included in a nuclear power plant system in a second embodiment according to the present invention in a typical sectional view. The high-temperature water purifying apparatus 40 is suitable for purifying high-temperature water in a liquid phase, which does not mean that the high-temperature water purifying apparatus 40 is not applicable to purifying steam. As shown in FIG. 5A, the high-temperature water purifying apparatus 40 is provided with a plurality of hollow membrane pipes 30, i.e., high-temperature filters.

As shown in FIGS. 4A and 4B, the hollow membrane pipe 30 is a double-wall structure having a skin 31 provided with minute pores capable of easily producing differential pressure and of catching minute particles, and a substrate 32 formed on the inner side of the skin 31 to hold the latter. The substrate 32 is provided with many minute pores greater than those of the skin 31. The substrate 32 has a tubular shape defining a hollow bore 33.

Desirably, the size of the minute pores of the skin 31 is 0.45 μm or below. Sizes of most of particles of radioactive materials and corrosion products contained in reactor water are greater than 0.45 μm. Therefore the minute pores of the skin 31 are not clogged with those particles and surface filtering is possible when the sizes of the minute pores of the skin 31 are 0.45 μm or below.

The hollow membrane pipes 30 are not limited to those of the double-wall structure shown in FIG. 4B, but may be those of a multiple-wall structure.

The skin 31 and the substrate 32 may be formed of porous materials stable in high-temperature water, such as metals, alloys, composite materials or ceramic materials. More concretely, suitable materials for forming the skin 31 and the substrate 32 are oxides including ferrite oxides, $TiO_2$ and $ZrO_2$, metals capable of producing those oxides, and alloys capable of producing those oxides, including iron-base alloys, such as stainless steels, nickel-base alloys containing iron, titanium alloys and virally. Those materials are highly workable and are suitable for forming filters of appropriate hollow membrane construction having the shape of a complicated, hollow membrane.

Preferably, the substrate 32 is a porous, mesh, honeycomb or monolithic structure of particles, plates, ribbons or fibers.

The pores of the skin 31 are formed in sizes smaller than the particle sizes of minute particles to be caught by the skin 31 so that the pores of the skin 31 may not be clogged with the minute particles. The skin 31 can be formed by coating the substrate 32 with a thin coating of a fine ceramic material or a fine metal, and firing the thin coating. The sizes of pores of the thin coating are adjusted so that the sizes of the pores are in an appropriate range after the thin coating is corroded.

The hollow membrane pipe 30 does not need necessarily to consist of a plurality of exactly divided layers as shown in FIG. 4B, but may be a single wall structure having smaller pores in outer layers and larger pores in inner layers. It is desirable, when the hollow membrane pipe 30 is thus formed, that the sizes of the pores in the outermost layer are 0.45 μm or below.

The hollow membrane pipe 30 may be formed by working an original hollow membrane pipe of a metal, alloy or a composite material, into a hollow membrane pipe of cylindrical or pleated shape, and subjecting the hollow membrane pipe to corrosive oxidation in an atmosphere of high-temperature air or in an atmosphere containing steam thereby adjusting the pore's diameter at the outermost area of the membrane pipe.

It is preferable to provide the outer circumference and/or the inner circumference of the hollow membrane pipe with a strainer. The strainer prevents the effluence of broken materials if small breakages are formed in the substrate 32 of the hollow membrane pipe 30 and holds a filter aid stably on the outer circumference of the hollow membrane pipe 30.

Referring again to FIG. 5A, the high-temperature water purifying apparatus 40 has a vessel 40A. A water discharge port 42 and a backwashing liquid supply port 48 are formed in a part on one side and in a part on the other side, respectively, of an upper part of the vessel 40A. A drain port 47 is formed in the bottom wall of the vessel 40A. A water supply port 41 is formed in a lower part of the side wall of the vessel 40A. A water supply line (water supply pipe) 41A is connected to the water supply port 41 to supply highly contaminated water into the vessel 40A. A water discharge line (water discharge pipe) 42A is connected to the water discharge port 42 to discharge water purified by the high-temperature water purifying apparatus 40. The water supply line 41A and the water discharge line 42A are connected to a bypass line 49A, which is provided with a pre-coating pump 49B (pump for pre-coating), e.g. a mixing pump. Connected to the pre-coating pump 49B is a filter aid supply unit 49C that supplies a filter aid (described later), which is to be supplied into the vessel 40A.

An upper support plate 44 is disposed horizontally in the vessel 40A on a level below that of the water discharge port 42 and the backwashing liquid supply port 48. The upper support plate 44 is provided with a plurality of openings and upper ends of the hollow membrane pipes 30 are fitted in the openings of the upper support plate 44. The upper support plate 44 separates perfectly an upper space over the upper support plate 44 and a lower space under the upper support plate 44. Thus water is able to flow between the upper and the lower space only through the hollow membrane pipes 30.

A lower support plate 43 is disposed horizontally in the vessel 40A on a level below that of the water supply port 41 of the vessel 40A and above that of the drain port 47. The lower support plate 43 is provided with a plurality of openings. The lower ends of the hollow membrane pipes 30 are set on parts not provided with the openings of the lower support plate 43 so that the lower ends of the hollow membrane pipes 30 are closed. Water is able to flow between an upper space over the lower support plate 43 and a lower space under the same only through the openings of the lower support plate 43.

In FIG. 5A, the upper support plate 44 and the lower support plate 43 are fixedly disposed in the vessel 40A and the hollow membrane pipes 30 are held by the upper support plate 44 and the lower support plate 43. The upper support plate 44, the lower support plate 43 and the hollow membrane pipes 30 may be assembled in a cartridge beforehand to replace an old cartridge with a new cartridge. The vessel 40A of the high-temperature water cleaning apparatus 40 may be divided into an upper part having a lower end provided with a flange, and a lower part having an upper end provided with a flange, and the upper and the lower part of the vessel 40A may be joined together by fastening together the flanges, which will facilitate replacing an old cartridge with a new one. When the vessel 40A is thus divided into the upper and the lower part, only the hollow membrane pipes 30 may be replaced with new ones.

Figure 5B:
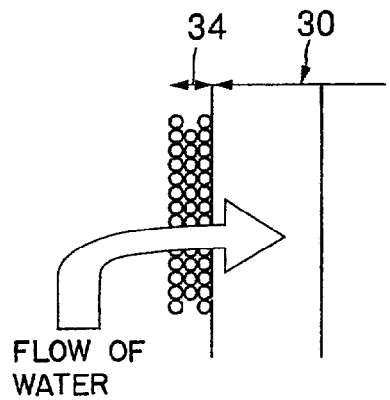
FIG. 5B is an enlarged view of a part $V_B$ in FIG. 5A of assistance in explaining a hollow membrane pipe.

In operation, a filter aid supply unit 49C supplies a filter aid into the bypass line 49A, and the filter aid is mixed with the water in the bypass line 49A. The water mixed with the filter aid is circulated so that it is supplied into the vessel 40A through the water supply port 41, and is discharged from the water discharge port 42 to return it into the bypass line 49A. While the water mixed with the filter aid is circulated, the filter aid unable to pass through the hollow membrane pipes 30 is gathered on the surfaces of the hollow membrane pipes 30 to form filter aid precoatings 34 on the surfaces of the hollow membrane pipes 30 as shown in FIG. 5B.

The filter aid must be at least stable under a condition where high-temperature water is used and capable of ion-exchanging ability. Preferable filter aids are ferrite oxides including hematite ($Fe_2O_3$), magnetite ($Fe_2O_4$) and nickel ferrite ($NiFe_2O_4$), $TiO_2$ and $ZrO_2$. As mentioned in connection with the description of the first embodiment, organic materials decomposing effect of a photocatalytic reaction caused by Cerenkov radiation can be expected of $TiO_2$.

Other possible filter aids include pure metals, such as Fe, Ni, Ti and Zr, which are the principal components of the foregoing oxides, alloys of those metals, such as stainless steels, and composite materials respectively containing those metals and alloys.

Since the sizes of the pores of the skins of the hollow membrane pipes 30 are 0.45 μm above, it is preferable that the filter aid has a particle size of 1 μm or above to prevent clogging the minute pores of the hollow membrane pipes 30 with the filter aid.

In view of the ion-exchanging ability and restriction of the rise in the differential pressure, it is preferable that the filter aid particle has a large specific surface and voidage.

Since it is difficult to produce ceramic powder having a large particle size, the filter aid having a particle size on the order of 1 μm may be a porous, fine powder having a large specific surface and a large voidage, because a substance having a particle size greater than the size of the minute pores of the hollow membrane pipes 30 can be held in the vessel 40A. Such a filter aid can be produced by sintering fine particles of 1 μm or below in particle size and economically advantageous.

After the filter aid precoatings 34 have been formed on the hollow membrane pipes 30, the bypass line 49A is disconnected from the water supply line 41A and the water discharge line 42A, and then contaminated water to be cleaned is supplied through the water supply port 41 into the vessel 40A. The filter aid precoatings 34 trap radiation-contaminated particles and radioactive ions contained in the contaminated water and filtered water having a reduced radioactivity penetrates the hollow membrane pipes 30. The filtered water penetrated the skins 31 and the substrates 32 of the hollow membrane pipes 30 flows through the bores 33 of the hollow membrane pipes 30 into a water collecting chamber 45, i.e., the upper apace extending over the upper support plate 44. The filtered water is discharged from the water collecting chamber 45 of the vessel 40 through the water discharge port 42 and the discharge line 42A.

The thus contaminated filter aid precoatings 34 are cleaned by backwashing. Valves on the lines connected to the water supply port 41 and the water discharge port 42 are closed and backwashing liquid is supplied through the backwashing liquid supply port 48 into the vessel 40. The backwashing liquid flows through the bores 33 of the hollow membrane pipes 30, the substrates 32 and the skins 31 in that order removing the contaminated filter aid precoatings 34 and corrosion products adhering to the hollow membrane pipes 30 from the hollow membrane pipes 30. The thus contaminated, turbid backwashing liquid flows through spaces between the hollow membrane pipes 30 and the openings of the lower support plate 43 into a drain chamber 46, i.e., the lower space under the lower support plate 43. Then, the contaminated, turbid backwashing liquid is discharged through the drain port 47. When an organic acid is added to the backwashing liquid, the hollow membrane pipes 30 can be simultaneously decontaminated and cleaned.

Although the foregoing description has been made on an assumption that the outer circumferences of the hollow membrane pipes 30 are coated with the filter aid precoatings 34, the outer circumferences of the hollow membrane pipes 30 do not need necessarily to be coated with the filter aid; the filter aid is sufficiently effective when the precoating liquid is stirred in the vessel 40A of the high-temperature water purifying apparatus 40 such that particles of the filter aid are suspended in the precoating liquid. Particles of the filter aid can be kept suspended in the precoating liquid provided that the velocity of the upward flow of the precoating liquid in the vessel 40A is higher than a sedimentation velocity corresponding to the Stokes radius of particles of the filter aid.

A high-temperature filter of the aforesaid type is advantageous over a low-temperature filter in respect of rise in differential pressure due to the collection of particles of corrosion products. However, the high-temperature filter is very disadvantageous in respect of ion exchange because ion-exchanging materials capable of changing ions at a high rate under a high-temperature condition are unavailable. Therefore, the amount of the ion-exchanging material or the surface area must be increased to increase the ion-exchanging ability. Trade-off between the enhancement of trapping minute particles and the reduction of differential pressure must be determined properly. Thus, filtration area must be increased and the rise of differential pressure must be prevented.

With an inorganic material that can be used at a high temperature, trapping rate at which ions are trapped by the surface of a material is low as compared with rate of carrying ions from a vapor. A low-temperature removing apparatus using an ion-exchange resin and a high-temperature water purifying apparatus using an inorganic ion exchanging material differ greatly from each other in that respect. The rate of ion trapping reaction is not dependent on the rate of carrying ions from a fluid to the surface of a material but is dependent on the rate of ion trapping reaction on the surface of a material.

Ion trapping rate when a filter aid of a stainless steel is used will be explained. Component members of the pressure vessel of a BWR of a 1100 MW class, and devices and apparatus installed in the pressure vessel are made of stainless steels. Ferrite is formed on the surfaces of those component members. Generally, the outer surface of 5000 m$^2$ of a reactor core corresponds to a reactor water purifying apparatus using a low-temperature ion-exchange resin of a 1%-equivalent capacity when the reactor water has a high Ni ion concentration or to a reactor water purifying apparatus using a low-temperature ion-exchange resin of a 4%-equivalent capacity when the reactor water has a low Ni ion concentration (value at 1 EFPY and removing rate is proportional to t$^{-1/2}$, where t is time). When stainless steel hollow membrane pipes and a stainless steel filter aid are used and the reactor water has a high Ni ion concentration, a necessary surface area for 8%-equivalent capacity is 40,000 m$^2$. Calculated values for a 100 μm diameter spherical shape, a 10 μm diameter spherical shape and 1 μm diameter spherical shape are 15 m$^3$, 1.5 m$^3$ and 0.15 m$^3$, respectively. When the reactor water has a small Ni ion concentration, calculated values sufficient for a 100 μm diameter spherical shape, a 10 μm diameter spherical shape and 1 μm diameter spherical shape are 4 m$^3$, 0.4 m$^3$ and only 0.04 m$^3$, respectively.

Figure 6:
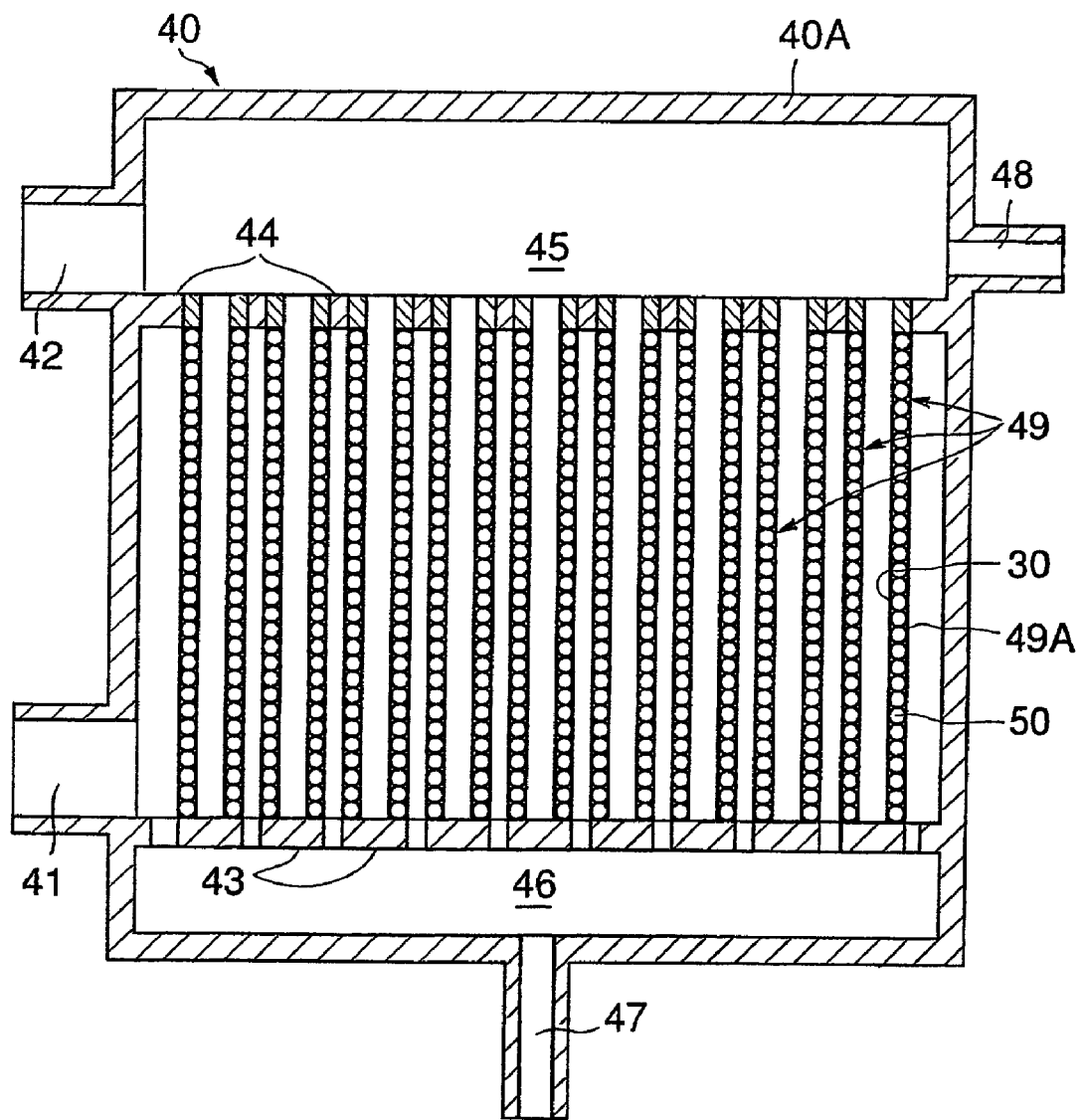
FIG. 6 is a schematic longitudinal sectional view of another embodiment of the high-temperature water purifying apparatus.

FIG. 6 shows a high-temperature water purifying apparatus in a modification of the high-temperature water purifying apparatus shown in FIG. 5A. The high-temperature water purifying apparatus shown in FIG. 6 has composite hollow membrane pipes 49 each consisting of a hollow membrane pipe 30, a strainer 49A surrounding the hollow membrane pipe 30 so as to define an annular space between the hollow membrane pipe 30 and the strainer 49A, and filter aid particles 50 packed in the annular space. A filter aid forming the filter aid particles 50 is the same as that forming the filter aid precoatings 34 or a filter aid similar to the filter aid forming the filter aid precoatings 34.

The high-temperature water purifying apparatus shown in FIG. 6, similarly to the high-temperature water purifying apparatus included in the nuclear power plant system in the second embodiment, has an upper support plate 44 and a lower support plate 44 fixedly disposed in a vessel 40A and the hollow membrane pipes 30 are extended between and held by the upper support plate 44 and the lower support plate 43. The upper support plate 44, the lower support plate 43, the hollow membrane pipes 30, the strainers 49A and the filter aid particles 50 may be assembled in a cartridge beforehand. An old cartridge can be readily replaced with a new one. The vessel 40A of the high-temperature water cleaning apparatus 40 may be divided into an upper part having a lower end provided with a flange, and a lower part having an upper end provided with a flange, and the upper and the lower part of the vessel 40A may be joined together by fastening together the flanges, which will facilitate replacing old hollow membrane pipes 30 with new ones.

The high-temperature water purifying apparatus is applicable to both purifying high-temperature steam and purifying high-temperature water.

Third Embodiment

A high-temperature water purifying apparatus 40 included in a nuclear power plant system in a third embodiment according to the present invention will be described with reference to FIG. 7, in which parts like or corresponding to those of the high-temperature water purifying apparatus shown in FIG. 5A are denoted by the same reference characters and the description thereof will be omitted to avoid duplication. The high-temperature water purifying apparatus shown in FIG. 6 is suitable for purifying high-temperature water in a vapor phase (i.e., steam). Referring to FIG. 7, the high-temperature water purifying apparatus 40 has a vessel 40A. A water discharge port 42 and a back-washing liquid supply port 48 are formed in a part on one side and in a part on the other side, respectively, of an upper part of the vessel 40A. A water supply port 41 is formed in the bottom wall of the vessel 40A. A drain port 47 is formed in a lower part of the side wall of the vessel 40A. A water supply line (water supply pipe) 41A is connected to the water supply port 41 to supply highly contaminated water into the vessel 40A. A water discharge line (water discharge pipe) 42A is connected to the water discharge port 42 to discharge water purified by the high-temperature water purifying apparatus 40.

An upper support plate 44 is disposed horizontally in the vessel 40A on a level below that of the water discharge port 42 and the backwashing liquid supply port 48. The upper support plate 44 is provided with a plurality of openings and upper ends of hollow membrane pipes 30 are fitted in the openings of the upper support plate 44. Parts not provided with the openings of the upper support plate 44 hold upper ends of hollow water strainer pipes 51. The upper support plate 44 closes the upper ends of the water strainer pipes 51. The upper support plate 44 separates perfectly an upper space over the upper support plate 44 and a lower space under the upper support plate 44. Thus water is able to flow between the upper and the lower space only through the hollow membrane pipes 30.

A lower support plate 43 is disposed horizontally in the vessel 40A on a level below that of the drain port 47 of the vessel 40A and above that of the water supply port 47. The lower support plate 43 is provided with a plurality of openings. The lower ends of the water strainer pipes 51 are fitted in the openings of the lower support plate 43. The lower ends of the hollow membrane pipes 30 are set on parts not provided with the openings of the lower support plate 43 so that the lower ends of the hollow membrane pipes 30 are closed. Water is able to flow between an upper space over the lower support plate 43 and a lower space under the same only through the water strainer pipes 51.

In this embodiment, the hollow membrane pipes 30 are arranged in the shape of a hexagonal lattice and the water strainer pipes 51 are disposed at the centers of hexagonal lattices, respectively. Therefore, the ratio between the number of the hollow membrane pipes 30 and that of the water strainer pipes 51 is 2:1.

Spaces between the upper support plate 44 and the lower support plate 43 are packed with filter aid particles 50.

A filter aid forming the filter aid particles 50 is the same as or similar to the filter aid employed in the second embodiment.

High-temperature steam supplied through the water supply port 41 into the space under the lower support plate 43 flows through the water strainer pipes 51, the filter aid particles 50 and the hollow membrane pipes 30 in that order, flows into a water collecting chamber 45 extending over the upper support plate 44 and is discharged outside through the water discharge port 42. The filter aid particles and the hollow membrane pipes 30 purify the high-temperature steam while the same flows through the vessel 40A.

The specifications of the high-temperature water purifying apparatus 40 in this embodiment will be described hereinafter. The vessel 40A has a cylindrical shape. The hollow membrane pipes 30 of 25.4 mm in outside diameter and 5080 mm in length each having a filtration area of 0.405 m$^2$ are arranged in the shape of hexagonal lattices and are extended in parallel to each other in the vessel 40A. The water strainer pipes 51 have dimensions equal to those of the hollow membrane pipes 30 and are disposed at the centers of the hexagonal lattices, respectively. If the packing ratio of the filters, i.e., the hollow membrane pipes 30 and the water strainer pipes 51, is 75%, the filters can be arranged in a density of 1500 filters per square meter. The minimum size of the filter layers, i.e., regions packed with the filter aid, between the hollow membrane pipes 30 and the water strainer pipes 51 is 2.4 mm. The reactor vessel of a BWR of a 1100 MW(E) class is 6.4 m in inside diameter, 32 m$^2$ in sectional area and 163 m$^3$ in volume. Therefore the reactor vessel can be packed with 48,000 or more filters. Thus 3,200 filters among the 48,000 filters, i.e., ⅔ of the 48,000 filters, are the hollow membrane pipes 30 (total filtration area: 12,960 m$^2$). Since steal flows at 6,400 t/hr and steam is 0.036 t/m$^3$ in specific gravity, the face velocity of steam on the filter surface is 3.8 mm/s.

A filtration layer will be examined. The filtration layer is formed of spherical filter aid particles of a stainless steel arranged in an simple cubic lattice (void ratio: 48%, minimum void interval: 0.41 times the diameter of the filter aid particle) and is capable of removing $^{60}$Co ions at DF=10$^4$ calculated by using Expression (1). The radius of a void-equivalent cylinder is 0.39 μm when the diameter of the filter aid particles is 1 μm. Since the void ratio is 48%, the velocity of steam in the voids is 7.9 mm/s. Therefore, time necessary for steam to travel 1 mm is on the order of 0.13 s. Although the paths of water are assumed to be cylindrical, actually, since the filter aid particles are spherical, surface area is 1.28 times the cylindrical path. The thickness of a filter layer capable of removing ions by passing a fluid once through the filter layer will be calculated on an assumption that the chemical reaction of $^{60}$Co with steam on the surface of the filter aid particles and that of the same with water on the surface of the filter aid particles are the same. When the reactor water has a high Ni ion concentration, a filter of 5,000 m$^2$ in surface area filters the reactor water at 60 t/hr. Since the specific weight of high-temperature water is 0.74 t/m$^3$, high-temperature water is filtered at a volume purification rate of 81 m$^3$/hr, which corresponds to a purifying speed of 0.0162 m/hr, i.e., 4.5 μm/s. The DF of $^{60}$Co is a function of the length L (mm) of the void cylinder of the filtration layer expressed by Expression (1)

$$DF = e^{4.5 \times 2 \times 1.28/0.39 \times 0.13L} \quad (1)$$

If a filtration layer in which the distance between the water strainer pipe 51 and the hollow membrane pipe 30 is 2.4 mm is used, DF is on the order of 10$^4$. In this case, the volume of the filter aid particles is 41 m$^3$.

Water head L of a 2.4 mm thick filtration layer of 1 μm diameter spherical particles will be calculated by a method mentioned in "Physical and Chemical Processing for Waber Chemistry Control", Asakura Shoten, p. 126. It is known from Expression (2) that the water head loss is about 200 m.

$$h = JLv/g(1-\epsilon)^2/\epsilon^3 v(\sigma/d)^2 \quad (2)$$

where
  J (Constant of experiment): About 6
  L (Thickness of filtration layer): 2.4 mm
  ν (Coefficient of kinematic viscosity): 0.56×10$^{-6}$ m$^2$/s
  g (Gravitational acceleration): 9.8 M/s$^2$
  ϵ (Voidage): 0.48
  σ (Shape factor): About 6
  v (Hollow cylinder velocity): 0.0038 m/s
  d (Diameter of filter aid particles): 1 μm When the reactor water has a small Ni ion concentration, the volume of the filter aid particle is something over 10 m$^3$ and the head loss is about 50 m.

In all cases, it is difficult to install a high-temperature water purifying apparatus of 10$^4$ in DF in a BWR of 285° C. Supercritical water of 650° C. react with the filter aid at a high reaction rate about 100 times a reaction rate at which water of 285° C. reacts with the filter aid. Therefore, filter aid particles of particle sizes on the order of 24 μm (volume is 0.41 m$^3$) are satisfactory and the head loss is about 2 m and an object can be satisfactorily achieved. The amount of the filter aid particles may be increased by ten (volume of the filter aid particles is 4.1 m$^3$ and the particle size of the same is 1 μm). In such a case, the differential pressure can be reduced by a factor of 1/10. Thus, both the increase of differential pressure and trapping capacity can be simultaneously satisfied.

Figure 1:
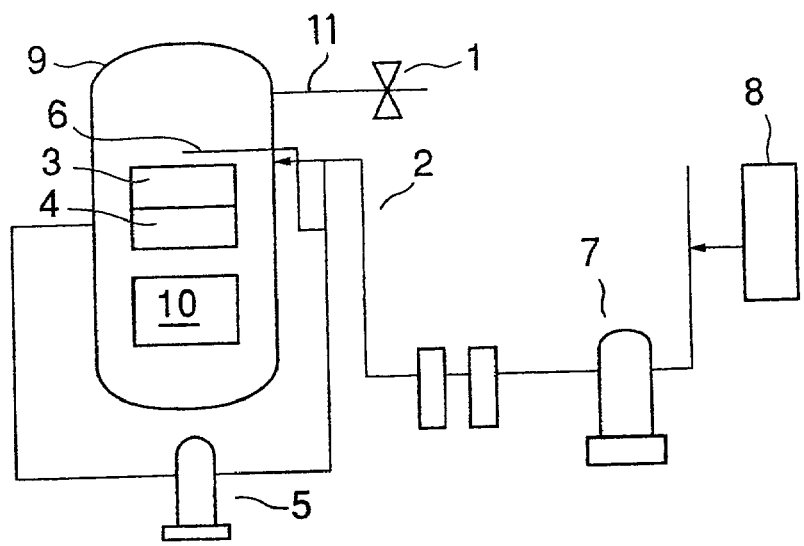
FIG. 1 is a diagrammatic view of a reactor pressure vessel and the associated systems.

The high-temperature water purifying apparatus in the second or the third embodiment is installed in the pressure vessel 9 of the nuclear reactor shown in FIG. 1 or in a line extending between the pressure vessel 9 and the steam valve 1 placed at the inlet of the turbine system to separate and remove radioactive materials effectively and to reduce the migration of radioactive materials to the steam system.

Since a new nuclear power plant has a large degree of freedom of design, a new high-temperature water purifying apparatus can be installed in the new nuclear power plant. In most cases, it is difficult or impossible to install a new high-temperature water purifying apparatus in an existing nuclear power plant. In such a case, improvements are incorporated into the corrugated plates of an existing dryer, for example, in a manner mentioned in connection with the first embodiment to provide the dryer additionally with the functions of a high-temperature water purifying apparatus.

The high-temperature water purifying apparatus in the second or the third embodiment can be installed in the pressure vessel 9 of the nuclear reactor or in a line extending between the pressure vessel 9 and the steam valve 1 placed at the inlet of the turbine system. Usually, a steam line 11 connecting a nuclear reactor system and a steam and turbine system is provided with a stem shutoff valve, not shown, to make provision for the occurrence of a trouble in the steam and turbine system. Therefore it is highly safe to install the high-temperature water purifying apparatus at a position below the steam shutoff valve and above the steam valve 1 placed at the inlet of the turbine. When the high-temperature water purifying apparatus is installed between the pressure vessel 9 and the steam valve 1 placed at the inlet of the turbine, the line extended between the pressure vessel 9 and the steam valve 1 may be provided with a bypass line bypassing the high-temperature water purifying apparatus.

Heat loss that will be caused by the high-temperature water purifying apparatus in the third embodiment is smaller than that will be caused by a reactor water purifying apparatus employing a conventional ion-exchange resin. As obvious from Table 1, the viscosity coefficient of water decreases greatly as the temperature of water rises. Therefore initial differential pressure in the high-temperature water purifying apparatus is far less than that in a low-temperature filter of the same configuration.

TABLE 1

VISCOSITY COEFFICIENT OF WATER AND STERM

|  | Water | Saturated water | Saturated steam | Supercritical water |
|---|---|---|---|---|
| Temperature (° C.) | 25 | 285 | 285 | 650 |
| Pressure (Mpa) | 0.1 | 7.0 | 7.0 | 25 |
| Density (kg/m$^3$) | 1000 | 740 | 36 | 59 |
| Viscosity coefficient (μPas) | 891 | 90 | 20 | 39 |

The high-temperature water purifying apparatus in the embodiments employ an ion-exchange material stable in high-temperature water. Such an ion-exchange material has a long service life. The capacity of a low-temperature reactor water purifying apparatus employing the present ion-exchange resin is 2% of the flow rate of water. For example, addition of a high-temperature water purifying apparatus of an 8%-equivalent capacity can reduce the radioactive material concentration of the reactor water by a factor of ⅕ and can reduce the migration of radioactive materials to the steam system accordingly.

Preferably, the iron concentration of the feed water is limited to 1 ppb or below to suppress the rise of the differential pressure in the high-temperature water purifying apparatus. Rise of the differential pressure in the high-temperature water purifying apparatus is attributable to the accumulation of particles of corrosion products in the high-temperature water purifying apparatus. Iron is the principal component of the corrosion products. Most part of iron contained in the corrosion products is contained in a leakage from a condensate purifying system. It is know from the past records of operation that the iron concentration of the feed water can be limited to 0.1 ppb or below and to about 0.02 ppb on an average by providing the condensate purifying system with a hollow fiber filter.

Such an iron concentration is 1/10 or below of the iron concentration of feed water from a plant not provided with any hollow fiber filter. The high-temperature water purifying apparatus was operated experimentally in a plant not provided with any hollow fiber filter. The service life of the high-temperature water purifying apparatus was several years. It is conjectured from this fact that the service life of the high-temperature water purifying apparatus can be extended to a number of years nearly equal to the service life of the plant by suppressing the iron concentration of the feed water supplied to the high-temperature water purifying apparatus to a value not greater than a predetermined limit.

Although a method of suppressing the migration of the radioactive materials to the steam system by filtering out the radioactive materials has been described, it is effective to reduce the generation of steam containing radioactive materials.

It is effective in reducing the generation of steam containing radioactive materials to use water supplied from a condensate purifying apparatus or a condensate storage tank 8 shown in FIG. 1 instead of water discharged from the reactor water purifying system 5 by the head spray 6. Since the radioactive material concentration of the water supplied from the condensate purifying apparatus or the condensate storage tank 8 is smaller than that of the water discharged from the reactor water purifying system 5, steam produced by spraying water by the head spray 6 has a low radioactive material concentration. In view of a recent mode of operation to cool the nuclear reactor quickly by using a head spray when the nuclear reactor is shut down, the effect of reduction of the generation of steam containing radioactive materials is significant.

It is preferable in reducing the amount of steam containing radioactive materials to direct the nozzles of the head spray toward in-pile structures so that water sprayed by the head spray may not fall directly on the pressure vessel heated at a high temperature, to interpose a cover between the inner surface of the pressure vessel and the nozzles of the head spray so as to cover the inner surface of the reactor vessel from sprayed water, and to define a region in which water is sprayed, to spray water in small particles by using appropriate nozzles or an ultrasonic spraying device and to control the amount of water to be sprayed according to the amount of steam generated by heat generated after shutdown. Preferably, the head spray 6 has a shower head provided with a plurality of nozzle holes of a diameter not greater than 1 mm arranged in an area of about 400 cm$^2$, and water is sprayed so as to wet the dryer entirely and all the sprayed water fall on the dryer.

The systems now in use uses water of a temperature nearly equal to that of the pressure vessel delivered from the reactor water purifying system in order that relatively low thermal stress may be induced in the pressure vessel when the reactor vessel is wetted with water sprayed by the head spray. However, the dropping rate of the temperature of the pressure vessel is lower than that of the temperature of the reactor water. Consequently, the temperature difference between the pressure vessel and the reactor water increases with time. Therefore, this method is able to lower the temperature of the nuclear reactor safely and efficiently by suppressing the spread of water sprayed by the head spray, spraying water in small drops and bringing steam of a low temperature into contact with the pressure vessel according to the amount of steam generated after shutdown.

What is claimed is:
1. A nuclear power plant system comprising:
a nuclear reactor;
a steam turbine that uses steam generated in a pressure vessel included in the nuclear reactor; and
a radioactive material separating and removing apparatus placed on corrugated plates of a dryer arranged in the pressure vessel, or placed in a steam passage extended between the pressure vessel and an inlet of the steam turbine, the radioactive material separating and removing apparatus including a surface having superhigh hydrophilic TiO$_2$ and adapted to trap thereon radioactive corrosion products contained in a plurality of water drops so that the radioactive corrosion products firmly adhere on the surface, in order to separate and remove radioactive corrosion products from the plurality of water drops.
2. A nuclear power plant system comprising:
a nuclear reactor having a pressure vessel which generates steam therein;
a steam turbine that uses the steam generated by the nuclear reactor; and
a dryer arranged in the pressure vessel to dry the steam to be supplied to the steam turbine, the dryer having a plurality of corrugated plates defining therebetween passages through which a multiphase flow containing the steam, water drops and radioactive substances flows, wherein the corrugated plates have surfaces having superhigh hydrophilic $TiO_2$.

3. The nuclear power plant system according to claim 2, wherein the superhigh hydrophilic $TiO_2$ is formed in fiber.

4. The nuclear power plant system according to claim 2, wherein the surface of the corrugated plates are coated with a coating containing $TiO_2$ and $SiO_2$.

5. The nuclear power plant system according to claim 2, wherein each of the corrugated plates includes thereon a p-type oxide film and the superhigh hydrophilic $TiO_2$ is a coating on the p-type oxide film, and wherein the superhigh hydrophilic $TiO_2$ is an n-type oxide.

6. The nuclear power plant system according to claim 2, wherein the dryer is provided with a means for creating an electric field or a magnetic field between adjacent corrugated plates, adapted so that minute radioactive particles contained in the multiphase flow are biased toward the corrugated plates by the electric field or the magnetic field.

7. The nuclear power plant system according to claim 6, wherein the means for creating an electric field or a magnetic field comprises a photocell including:
   an n-type semiconductor, which is the superhigh hydrophilic $TiO_2$ deposited on the corrugated plates; and
   a film of a corrosion product, which is a p-type semiconductor, produced by a corrosion of surfaces of the corrugated plates.

\* \* \* \* \*